United States Patent
Coatney et al.

(10) Patent No.: US 7,321,982 B2
(45) Date of Patent: Jan. 22, 2008

(54) SYSTEM AND METHOD FOR TAKEOVER OF PARTNER RESOURCES IN CONJUNCTION WITH COREDUMP

(75) Inventors: Susan M. Coatney, Cupertino, CA (US); John Lloyd, Roseville, CA (US); Jeffrey S. Kimmel, Chapel Hill, NC (US); Brian Parkison, Felton, CA (US); David Brittain Bolen, Durham, NC (US)

(73) Assignee: Network Appliance, Inc., Sunnyvale, CA (US)

( * ) Notice: Subject to any disclaimer, the term of this patent is extended or adjusted under 35 U.S.C. 154(b) by 542 days.

(21) Appl. No.: 10/764,809

(22) Filed: Jan. 26, 2004

(65) Prior Publication Data

US 2005/0177770 A1   Aug. 11, 2005

(51) Int. Cl.
   *G06F 11/00*   (2006.01)
(52) U.S. Cl. .............................. 714/4; 714/11; 714/13
(58) Field of Classification Search ................. None
   See application file for complete search history.

(56) References Cited

U.S. PATENT DOCUMENTS

| | | | |
|---|---|---|---|
| 5,163,131 A | 11/1992 | Row et al. | |
| 5,355,453 A | 10/1994 | Row et al. | |
| 5,485,579 A | 1/1996 | Hitz et al. | |
| 5,802,366 A | 9/1998 | Row et al. | |
| 5,819,292 A | 10/1998 | Hitz et al. | |
| 5,931,918 A | 8/1999 | Row et al. | |
| 5,941,972 A | 8/1999 | Hoese et al. | |
| 5,963,962 A | 10/1999 | Hitz et al. | |
| 5,996,086 A | 11/1999 | Delaney et al. | |
| 6,038,570 A | 3/2000 | Hitz et al. | |
| 6,065,037 A | 5/2000 | Hitz et al. | |
| 6,249,879 B1 | 6/2001 | Walker et al. | |
| 6,425,035 B2 | 7/2002 | Hoese et al. | |
| 6,775,702 B2 | 8/2004 | Oeda et al. | |
| 6,792,559 B1* | 9/2004 | Cohen et al. | 714/15 |
| 2006/0150035 A1* | 7/2006 | Fujimoto | 714/54 |

OTHER PUBLICATIONS

U.S. Appl. No. 10/027,909, Steven R. Klinkner.
U.S. Appl. No. 10/035,607, Peter F. Corbett et al.
U.S. Appl. No. 10/394,810, Scott Schoenthal et al.
U.S. Appl. No. 10/105,872, Steven Rodrigues et al.
U.S. Appl. No. 10/764,773, Loellyn J. Cassell et al.
U.S. Appl. No. 10/394,819, Loellyn J. Cassell.
U.S. Appl. no. 10/027,457, Susan M. Coatney et al.

(Continued)

*Primary Examiner*—Yolanda L Wilson
(74) *Attorney, Agent, or Firm*—Cesari and McKenna LLP

(57) ABSTRACT

A system and method for allowing more rapid takeover of a failed filer by a clustered takeover partner filer in the presence of a coredump procedure (e.g. a transfer of the failed filer's working memory) is provided. To save time, the coredump is allowed to occur contemporaneously with the takeover of the failed filer's regular, active file service disks by the partner so that the takeover need not await completion of the coredump to begin. This is accomplished, briefly stated, by the following techniques. The coredump is written to a single disk that is not involved in regular file service, so that takeover of regular file services can proceed without interference from coredump. A reliable means for both filers in a cluster to identify the coredump disk is provided, which removes takeover dependence upon unreliable communications mechanisms. A means is provided for identification during takeover of the coredump disk and SCSI-3 reservations are employed to coordinate write access to (ownership of) shared disks, so as to prevent takeover from interfering with coredump while simultaneously preventing the failed filer from continuing to write regular file system disks being taken over by its partner.

28 Claims, 5 Drawing Sheets

OTHER PUBLICATIONS

David Hitz et al. TR3002 File System Design for a NFS File Server Appliance published by Network Appliance, Inc.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

Fielding et al. (1999) Request for Comments (RFC) 2616, HTTP/1.1.

American National Standards Institute, Inc.; American National Standard for Information Technology; Fibre Channel- Physical and Signaling Interface (FC-PH), Nov. 14, 1994.

American National Standards Institute, Inc.; American National Standard for Information Technology—Fibre Channel Arbitrated Loop (FC-AL-2); Dec. 8, 1999.

New Identifier Formats Based on IEEE Registration; http://standards.ieee.org/regauth/oui/tutorials/fibreformat.html; Accessed on Aug. 6, 2001.

Draft Proposed American National Standard for Information Systems—SCSI-3 Primary Commands; Mar. 28, 1997.

Fibre Channel Generic Services—3 (FC-GS-3), Revision 6.0; NCITS Wrokign Draft Proposed American National Standard for Information Technology; Nov. 24, 1999.

International Search Report for International Application No. PCT/US2005/002141, Iveta Bujanska, Jun. 6, 2005.

Anupam Bhide, Elmootazbellah N. Elnozahy, Stephen P. Morgan, "A Highly Available Network File Server," Proceedings of the Winter 1991 USENIX Conference, Jan. 21-25, 1991, pp. 199-205.

* cited by examiner

SYSTEM AND METHOD FOR TAKEOVER OF PARTNER RESOURCES IN CONJUNCTION WITH COREDUMP

RELATED APPLICATION

The invention is related to U.S. patent application Ser. No. 10/764,773 entitled SYSTEM AND METHOD OF SELECTION AND COMMUNICATION OF A DISK FOR STORAGE OF A COREDUMP, filed on even date herewith, and incorporated herein by reference.

FIELD OF THE INVENTION

The present invention relates to networked file servers and more particularly to the takeover by one file server of another panicking or failed file server in a cluster of networked file servers.

BACKGROUND OF THE INVENTION

File Servers

A file server (also termed herein "filer") is a computer that provides file services relating to the organization of information on storage devices, such as disks. A file server or filer includes a storage operating system that implements a file system to logically organize the information as a hierarchical structure of directories and files on the disks. Each "on-disk" file may be implemented as a set of data structures, e.g. disk blocks, configured to store information, such as text. On the other hand, a directory may be implemented as a specially formatted file in which information about other files and directories are stored.

A filer may be configured to operate according to a client/server model of information delivery to thereby allow many clients to access files stored on a server, i.e., the filer. In this model, the client may comprise an application, such as a file system protocol, executing on a computer that "connects" to the filer over a computer network, such as a point-to-point link, shared local area network (LAN), wide area network (WAN), or virtual private network (VPN) implemented over a public network such as the internet.

One type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the Write Anywhere File Layout (WAFL™) file system available from Network Appliance, Inc. of Sunnyvale, Calif. The WAFL file system is implemented within a microkernel as part of the overall protocol stack of the filer and associated disk storage. This microkernel is supplied as part of Network Appliance's Data ONTAP™ storage operating system, residing on the filer that processes file-service requests from network-attached clients.

As used herein, the term "storage operating system" generally refers to the computer-executable code operable on a storage system that implements file system semantics and manages data access. In this sense, Data ONTAP™ software is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

Disk storage is typically implemented as one or more storage "volumes" that comprised of a set of physical storage disks, defining an overall logical arrangement of storage space, as well as a set of "hot" spare disks which stand ready for use as needed for file services. Currently available filer implementations can serve a large number of discrete volumes. Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate storage of parity information with respect to the striped data. A spare disk is one that is properly reserved by the owning filer, but is currently not in use for file services. It stands ready for use as needed for volume creation, extending existing volumes, RAID reconstructions and other disaster recovery or maintenance related file service operations. In general, a reconstruction is an operation by which a spare disk is allocated to replace an active file system disk in a particular RAID group that has failed, parity calculations regenerate the data that had been stored on the failed disk from surviving disks, and the regenerated data is written to the replacement disk.

In the example of a WAFL file system, a RAID 4 implementation is advantageously employed. This implementation specifically entails the striping of data across a group of disks, and separate storage of parity on a selected disk of the RAID group. If a single disk in a RAID 4 group fails, then that group can continue to operate in a degraded mode. The failed disk's data can be reconstructed from the surviving disk via parity calculations. As described herein, a RAID group typically comprises at least one data disk and one associated parity disk (or possibly data/parity) partitions in a single disk) arranged according to a RAID 4, or equivalent high-reliability, implementation. However, other configurations (e.g. RAID 0, RAID 1, RAID 4, RAID 5, or RAID DP (Diagonal Parity)) are contemplated. A further discussion of RAID is found in commonly owned U.S. patent application Ser. No. 10/394,819, entitled QUERY-BASED SPARES MANAGEMENT TECHNIQUE, by Loellyn Cassell, et al., the teachings of which are expressly incorporated herein by reference.

As will be described further below, each disk is divided into a series of regions that allow data writing and access to occur on the disk in a predictable manner. These regions include generally a disk label that is used by the RAID layer. The on-disk label is, in essence, self-describing information for each disk that is actively attached to the storage system. The labels are used to dynamically assemble the disks into spare pools and volumes. The process of assembling disks into spare pools and volumes, based upon the disk labels, is called "disk label assimilation." In the case that the label identifies the disk as a part of a volume, the label is used to construct an in core configuration tree for that volume, starting from the disk object level up to the volume object level. Therefore, a label on a disk identifies that disk's participation in a RAID group and, furthermore, that group's association with plex, mirror and, ultimately, volume objects in the configuration tree. The label is located in a well-known location of the disk so that it can be queried by the RAID subsystem in accordance with, e.g., a discovery process during a boot operation. The discovery process illustratively implements a disk event thread described herein.

The storage system performs assimilation based upon disk labels and decides whether a given disk is to be placed into the general configuration of active storage, and where in the configuration it is to be placed. If a disk is deemed from its labels to be a "spare" and not part of the active storage configuration, then it is placed in a spares pool.

Other regions define the disk's table of contents, its file system area, a coredump region, into which coredump information is stored, ownership information (described below) and other relevant information, laid out in a logical and predictable manner within the disk's storage space. Certain information, like the table of contents, is located at a known offset so that the storage system can always access it when the disk is connected.

Internally, the file server or filer is a microprocessor-based computer in which one or more microprocessors are interconnected by a system bus to various system components that may be physically located on a motherboard and which include a memory, a buffer cache for storing data and commands, a network adapter for communicating over the LAN or another network, a firmware storage device such as an erasable programmable read only memory (EPROM—which may comprise a flash memory, that retains power during shutdown), that contains system firmware (including a boot mechanism), and various storage adapters for communicating with the physical disks attached to the filer.

Disks are typically enclosed in a shelf enclosure unit, or "shelf." A shelf is a physical enclosure that primarily provides power and connectivity to its disks.

Filers can be organized into groups or "clusters" in which two or more filers are linked together so as to provide fault-tolerant computing in the event that one of the cluster partners panics or fails. If so, an unfailed cluster partner takes over handling of the operations of the failed partner and assumes control of its disks. This is facilitated by a number of "failover" functions (to be described further below) including a failover monitor in each filer and a cluster interconnect between filers that provides a communication pathway in the event of a panic or failure.

In a clustered environment, each filer is physically connected to all disks that are part of a given cluster and one particular filer is deemed to "own" the disks that comprise the volumes serviced by that filer. This ownership means that the filer is responsible for servicing the data contained on those disks, and that only the filer that "owns" a particular disk should be able to write data to that disk. This solo ownership helps ensure data integrity and coherency. In one exemplary file system, disk ownership information can be stored in two locations: a definitive ownership sector on each disk, and through the use of Small Computer System Interface (SCSI) level 3 reservations. These SCSI-3 reservations are described in *SCSI Primary Commands -3*, by Committee T10 of the National Committee for Information Technology Standards, which is incorporated fully herein by reference. This method of ownership of disks is described in detail in U.S. patent application Ser. No. 10/027,457 entitled SYSTEM AND METHOD OF IMPLEMENTING DISK OWNERSHIP IN NETWORKED STORAGE, which is hereby incorporated by reference. Other models of disk ownership are expressly contemplated and it will be understood to one with knowledge in the area of network storage that the disclosed invention is not limited to the methods of ownership as described above. For example, a topology-based ownership scheme can be employed. This includes a traditional A/B cluster ownership scheme in which the filer connected to the A Fibre Channel port of a given disk shelf is deemed to be the default owner of that shelf, and all of the disks it contains, while the filer connected to the B port is the takeover cluster partner. Similarly, another topology-based scheme can be employed in which disk ownership is determined in part by the switch port to which a disk is connected. This exemplary scheme defines ownership based upon the switch port bank (e.g. a group of distinct ports) into which a disk's A port is connected. For example, using a commercially available Brocade Communications Systems, Inc. (of San Jose, Calif.) 3800 series switch, having 16 ports divided into Bank 1 (ports 0-7) and Bank 2 (ports 8-15), a filer connected to Bank 1 is deemed to own disks connected to Bank 2 so as to further ensure data redundancy. This is described in detail in *The FAS900 Series Appliance Cluster Guide* (part #210-00342), published by Network Appliance, Inc., May 2003 (see generally Chapter 3).

Filer Failure and Takeover

As used herein, a filer in a cluster configuration "panics" or "fails" when it detects some fatal problem which prevents it from continuing to execute normally, but is nonetheless able to communicate with other nodes in the cluster, including its cluster partner. Thus, the touchstone of such failure, is the continued ability to communicate in the cluster despite loss of some functionality or performance. This can also be called "soft failure" as distinguished from "hard failure," which occurs when the filer becomes unable to communicate with other nodes in the cluster, for example, upon loss of electrical power. Hence, a filer in which storage operating system panics is generally termed a "failed filer" (or a "failed file server").

When a filer fails in a clustered environment, the need arises to transfer the ownership of a volume from the failed filer to another partner filer in order to provide clients with continuous access to the disks. One method of "takeover" or "failover" is described in detail in U.S. patent application Ser. No. 09/933,883 entitled, NEGOTIATED GRACEFUL TAKEOVER IN A NODE CLUSTER.

In order to assist in ascertaining the cause of the fault (e.g. to "debug" the failed filer), the failed filer or other storage system typically performs a "coredump," operation, in which it writes its current working memory (also termed, the "coredump") contents to disk. Later, a coredump recovery process called "savecore" reads back the coredump data and generates a "coredump file," which it stores in the failed filer's root file system. The coredump file contains an image of the system memory and any non-volatile storage at the time the panic occurred. The image can be subsequently accessed and studied to assist in determining the cause of the failure event. This information assists in diagnosing the fault since it is a picture of the system at the time the failure occurred.

As noted below, time is of the essence in a panic scenario—thus, in order to expedite the complete creation of the coredump, the coredump operation typically spreads the coredump across specially allocated core regions located on multiple disks. Typically, the coredump file is written in (for example) 3-MB data chunks to the designated region in a set of non-broken/operative disk currently owned by the failed filer. When the designated region on a given disk fills up, that disk is taken out of the list of available disks. The 3-MB data chunks written to disks are typically uncompressed where space permits, or can be compressed where space is at a premium—and this compressed data can be written out sequentially to disks, rather than "sprayed" across the disk set, potentially filling some disks before others. Disks are numbered so that a resulting coredump file can be reassembled from the disk set at a later time.

In the case of a clustered environment, where more than one file server may be able to take control of a given disk set via ownership reservations, the coredump is only directed to owned disks of the failed filer. Because the coredump spreads the coredump over multiple disks, those disks are not otherwise accessible to the partner filer to begin the takeover process. Rather, the disks remain occupied with the actions of the failed filer in writing of the coredump. As the coredump disks must, typically, be accessed by the partner filer as part of a conventional takeover operation, the partner filer consequently delays the overall takeover process until the failed filer completes its coredump. In effect, the takeover process proceeds through two sequential steps: first coredump by the failed filer is completed, then takeover by the partner filer occurs. While the two steps (coredump and takeover) proceed, the failure may actually turn from "soft" to "hard," with the failed filer becoming completely inaccessible before takeover is fully completed. In addition, during this delay, data handled by the failed filer is inaccessible to clients, and is not made available again until takeover is complete. It is highly desirable to reduce unavailability of data from a cluster to the greatest extent possible, particularly in a block-based (SAN) environment in which clients are highly vulnerable to data unavailability. For example, if a file server does not respond within a set period of time, the SAN protocol may issue a network-wide panic, which may, in turn, lead to a total network shutdown. Thus, to avoid undesirable (and potentially crippling downtime), the overall takeover operation, including coredump, should be performed as quickly as possible.

SUMMARY OF THE INVENTION

This invention overcomes the disadvantages of the prior art by providing a system and method for allowing more rapid takeover of a failed filer by a clustered takeover partner filer in the presence of a coredump procedure (e.g. a transfer of the failed filer's working memory). To save time, the coredump is allowed to occur contemporaneously with the takeover of the failed filer's regular, active disks that store regular file service data by the partner so that the takeover need not await completion of the coredump to begin. This is accomplished, briefly stated, by the following techniques. The coredump is written to a single disk that is not involved in regular file service, so that takeover of regular file services can proceed without interference from coredump. A reliable mechanism for both filers in a cluster to identify the coredump disk is provided, which removes takeover dependence upon unreliable communications mechanisms. A mechanism is also provided for identification during takeover of the coredump disk, and SCSI-3 reservations are employed to coordinate write access to (ownership of) shared disks, so as to prevent takeover from interfering with coredump while simultaneously preventing the failed filer from continuing to write regular file system disks being taken over by its partner.

In accordance with one embodiment of the invention, each filer has a mechanism to monitor various aspects of its operations. In response to a detected failure, the failed filer performs a coredump onto the selected coredump disk. The coredump disk may be selected from among the spare disks owned by the failed filer, or may be another disk in communication with both the failed filer and the takeover partner filer. In one embodiment, as the failed filer initiates the coredump procedure on the coredump disk, it places a particular coredump attribute on a known header area in a known "core" region of the coredump disk. This attribute indicates to the partner filer that the failed filer is writing a coredump on the spare disk and that the partner filer should not place a reservation on this spare disk.

The failed filer also communicates the failure to a partner filer for takeover. As part of the takeover process, the partner filer scans all of the failed filer's disks, examining the attribute location on each disk's core region. In performing the takeover, the partner filer identifies the disk marked as the coredump disk, and bypasses it when asserting ownership by placing SCSI reservations. Once the reservation is placed on the disk, the failed filer can no longer write to those disks.

As the partner takes over the failed filer's disks, the failed filer continues to write the coredump onto the coredump disk, using the disk's significantly larger file system data region rather than the significantly smaller allocated core region. Once the coredump is complete, the attribute of the coredump disk is changed to indicate to the takeover partner filer that the failed filer has completed the coredump. Upon scanning for the attribute, the takeover partner filer is now permitted to establish ownership of the coredump disk. The partner generates a diagnostic coredump file at an appropriate time. This coredump file is stored in the failed filer's root file system (in the failed filer's disks, which it now owns) for later debugging. The coredump file is typically saved as a file in the root volume for subsequent access by an appropriate utility.

By allowing the partner filer to initiate takeover while the failed filer separately and contemporaneously performs its coredump onto a single coredump disk, takeover delay is reduced, thereby minimizing disruption of client access to disks.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

The teaching of this invention can be adapted to a variety of storage system architectures, but not limited to, a network-attached storage environment, a storage attached network and disk assembly directly attached to a client/host computer. The term "storage system" should therefore be taken broadly to include such arrangements. However, it should be understood that the teachings of this invention can be applied to any server systems. It is expressly contemplated that the various processes, architectures and procedures described herein can be implemented in hardware, firmware or software, consisting of a computer-readable medium including program instructions that perform a series of steps.

Clustered File Servers

Figure 1:
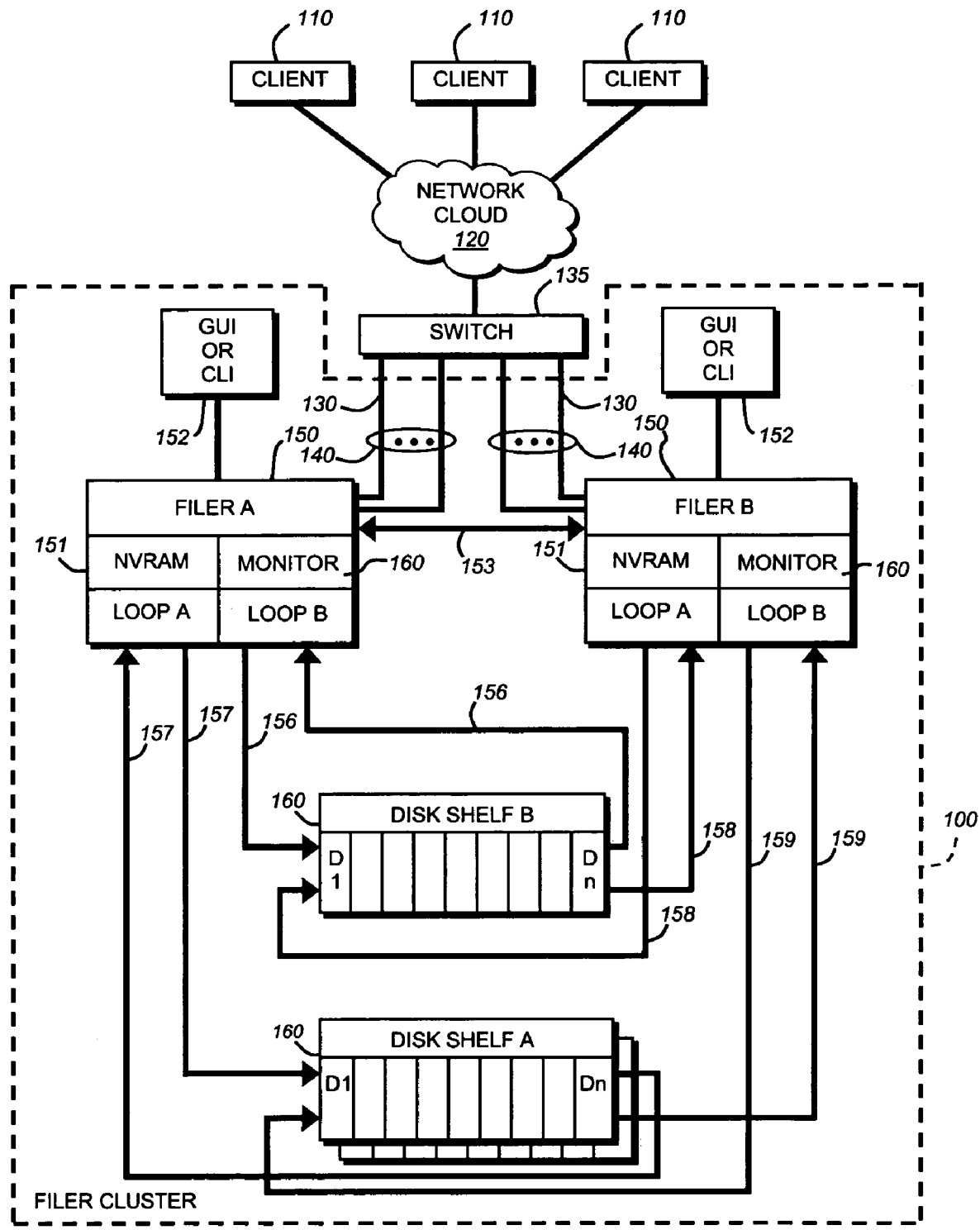
FIG. 1 is a block diagram of two filers connected in a cluster configuration that enables a partner filer to takeover a failed filer.

FIG. 1 is a block diagram of two filers or file servers designated filer A 150 and filer B 150 connected as two nodes in a filer cluster 100 as shown. For the purposes of this description Filer A and B should be considered functionally and structurally similar. However, they can vary functionally and structurally, according to alternate embodiments, so long as they can be clustered and each possesses takeover/failover capability with respect to the other. It should also be understood that, while only two filers and two associated disk shelves (160) are shown in the cluster configuration of FIG. 1, that a greater number of filers can be clustered for failover and that, typically, a greater number of associated disk shelves are employed. Further, there may be more than one volume associated with each filer, and each volume may be comprised of one or more RAID groups. In this description, the terms "filer," "file server" and "storage system" are used synonymously.

According to FIG. 1, filers A and B (150) are preferably file servers configured to provide file services relating to the organization of information on storage devices, such as hard disks D1-Dn in disk shelves A and B 160, respectively to clients 110 connected through a network 120. A client 110 may be a general-purpose computer, such as a personal computer (PC) or a workstation, configured to execute applications over an operating system that include file system protocols. Moreover, each client 110 interacts with a filer 150 in accordance with a client/server model of information delivery. That is, a client 110 requests the services of a filer 150, for example, to retrieve files or other data containers (e.g. blocks). In this example, clients 110 access filers 150 in cluster 100 via the network cloud 120, switch 135 and physical communication links 130 that may be arranged in aggregates or bundles 140.

While not shown, the cluster 100 can be connected via a network (for example a Fibre Channel loop) to other clusters or individual file servers/filers to form a networked storage system (such as a SAN). Appropriate interfaces and interconnects (not shown) are provided to each filer and/or disk shelf to implement such a networked storage arrangement.

Clients typically communicate with filers over a network using a known file system protocol consistent with the operating system running on the clients. The Network File System (NFS) is a file system protocol for accessing filers in a UNIX environment. The Common Internet File System (CIFS) is an open-standard, connection oriented protocol providing remote file access over a network and is used with filers to provide service to PCs in a Windows environment. Accordingly, CIFS is widely used with servers, such as filers, that have PC clients accessing them.

In the following paragraphs the description is often singularly referenced to filer A or B, but it should be kept in mind that the description also applies to the other filer.

As part of cluster operation, filers A and B (150) have primarily assigned to each of them a set of disks. The filers are controlled by a storage operating system, which may preferably be the Data ONTAP™ storage operating system available from Network Appliance, Inc. that is optimized to provide filer services. Both filers A and B have access to both disk shelves A and B, though in the example, Filer A "owns" disk shelf A and Filer B "owns" disk shelf B. Filer A accesses its disk shelf A via loop A 157, and accesses disk shelf B via loop B 156. Similarly, filer B has primarily assigned to it a disk shelf B that it accesses via its loop A, and accesses disk shelf A via its loop B. This joint access is necessary for a partner filer to access a failed filer's disk shelf to continue providing file services to the clients of the failed filer after a takeover.

Each filer, in this example, also implements a non-volatile random access memory (NVRAM) 151 that ensures fault-tolerant operation in the event of a failure of the filer. In particular, the NVRAM stores a given amount of data and information relative to the filers working memory and retains that data and information until it is committed to long-term storage at a predetermined "consistency point" in time.

Each exemplary filer also includes a failover monitor function. This senses a failure, panic or other event that may require a takeover of a failing filer by a cluster partner. At such time the monitor begins the takeover routine as described further below.

The takeover of a filer by a cluster partner employs a communication link established between filers A and B (150) that operates in a peer-to-peer capacity across one or more communication links, such as cluster interconnect 153. The cluster interconnect 153 can utilize any communication medium and protocol, including a Fibre Channel and a Server Net Failover link, both of which are commonly known in the industry. Note, as used herein, "Fibre Channel" is the general name of an integrated set of standards used for apparatus to quickly transfer data between all types of hardware in the computer industry. Filers A and B each have a conventional Graphical User Interface (GUI) or Command Line Interface (CLI) 152 that provide a manual interface to the filer cluster 100 for a system operator.

Figure 2:
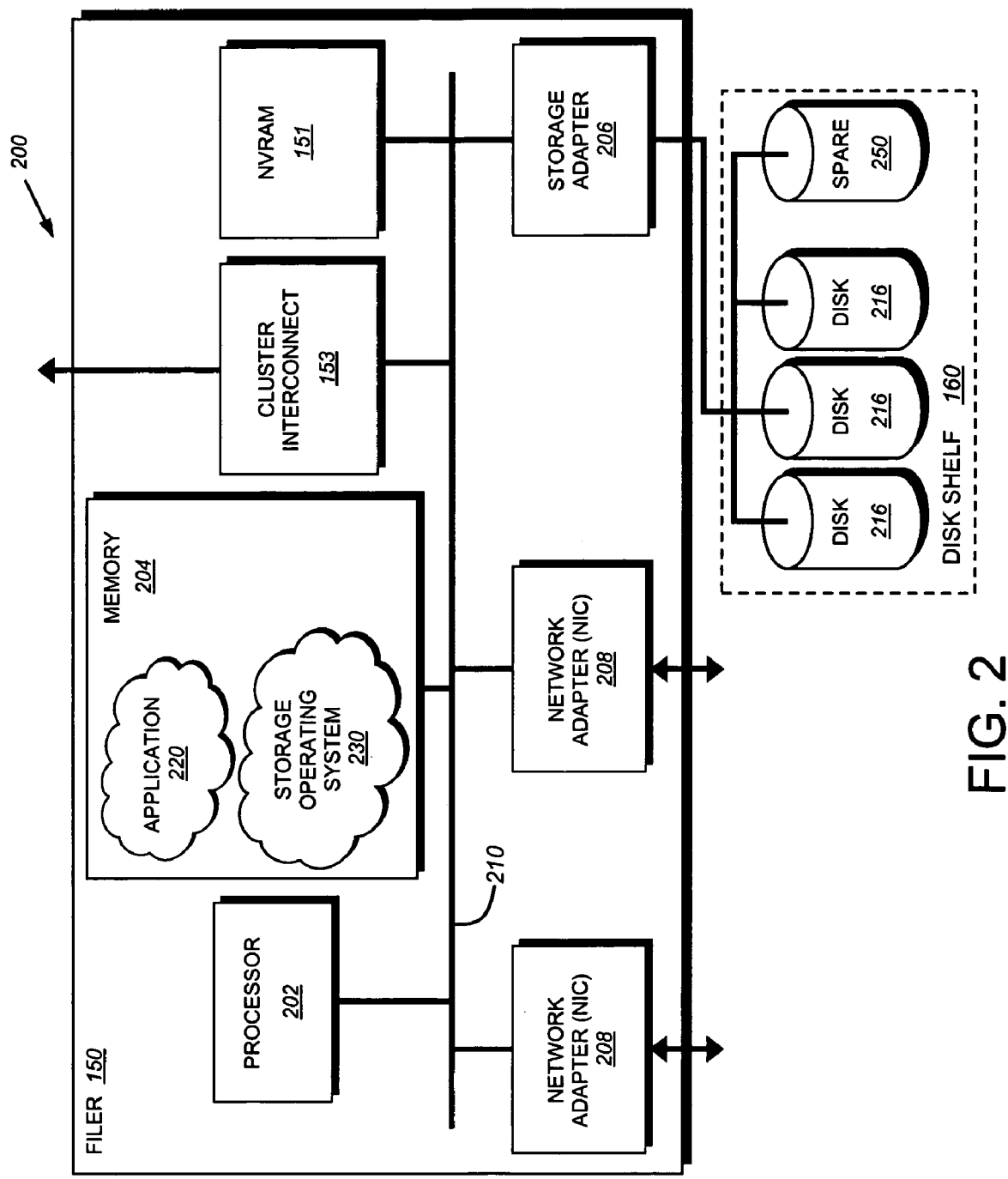
FIG. 2 is a block diagram of a filer that may be used with the present invention.

FIG. 2 is a block diagram 200 of an exemplary filer (A or B) 150 comprising a processor 202, cluster interconnect 153, NVRAM 151, a memory 204, a storage adapter 206 and at least one network adapter 208, all of which are interconnected by a system bus 210. The bus 210 can be a conventional peripheral computer interconnect (PCI) bus or another appropriate internal bus standard. In this embodiment, the storage adapter 206 is connected to disks 216 (D1-DN) via a Fibre Channel link. The filer 150 also includes the preferable storage operating system 230 stored in memory 204 that implements a file system to logically organize information stored as a hierarchical structure of directories and files. Disks in the associated volume are typically organized as one or more RAID (Redundant Arrays of Inexpensive Disks) groups to protect against data loss caused by disk failure in a manner known in the art. RAID groups can also improve data availability by enabling a filer to continue operation even when disks fail. A RAID group may be either entirely enclosed within a single shelf 160 (for example, shelf A or B as shown), or may span multiple hardware components, including shelves.

The storage adapter 206 cooperates with storage operating system 230 executing on processor 202 to access stored information requested by a client 110, which information is stored on hard disks 216 (D1-Dn). Storage adapter 206 includes input/output (I/O) interface circuitry that couples to the disks 216 over an I/O interconnect arrangement, such as a conventional high-performance, Fibre Channel serial link topology (not shown). Storage adapter 206 retrieves the stored information and it is processed, if necessary, by processor 202 (or storage adapter 206 itself) prior to being forwarded over system bus 210 to a network adapter 208, where the information is formatted into packets and returned via a network (not shown) to a client 110 (not shown in FIG. 2) that requested the information.

As discussed further below, one or more of the disks on the exemplary disk shelf 160 can be designated as "spare" disks 250. It is marked in the system as a spare, and stands ready for use when needed.

Each network adapter in FIG. 2 may comprise a network interface card (NIC) 208 having the necessary mechanical, electrical and signaling circuitry needed to connect a filer to a network node switch (not shown) via the physical communication links 130 shown in FIG. 1.

Storage Operating System

Figure 3:
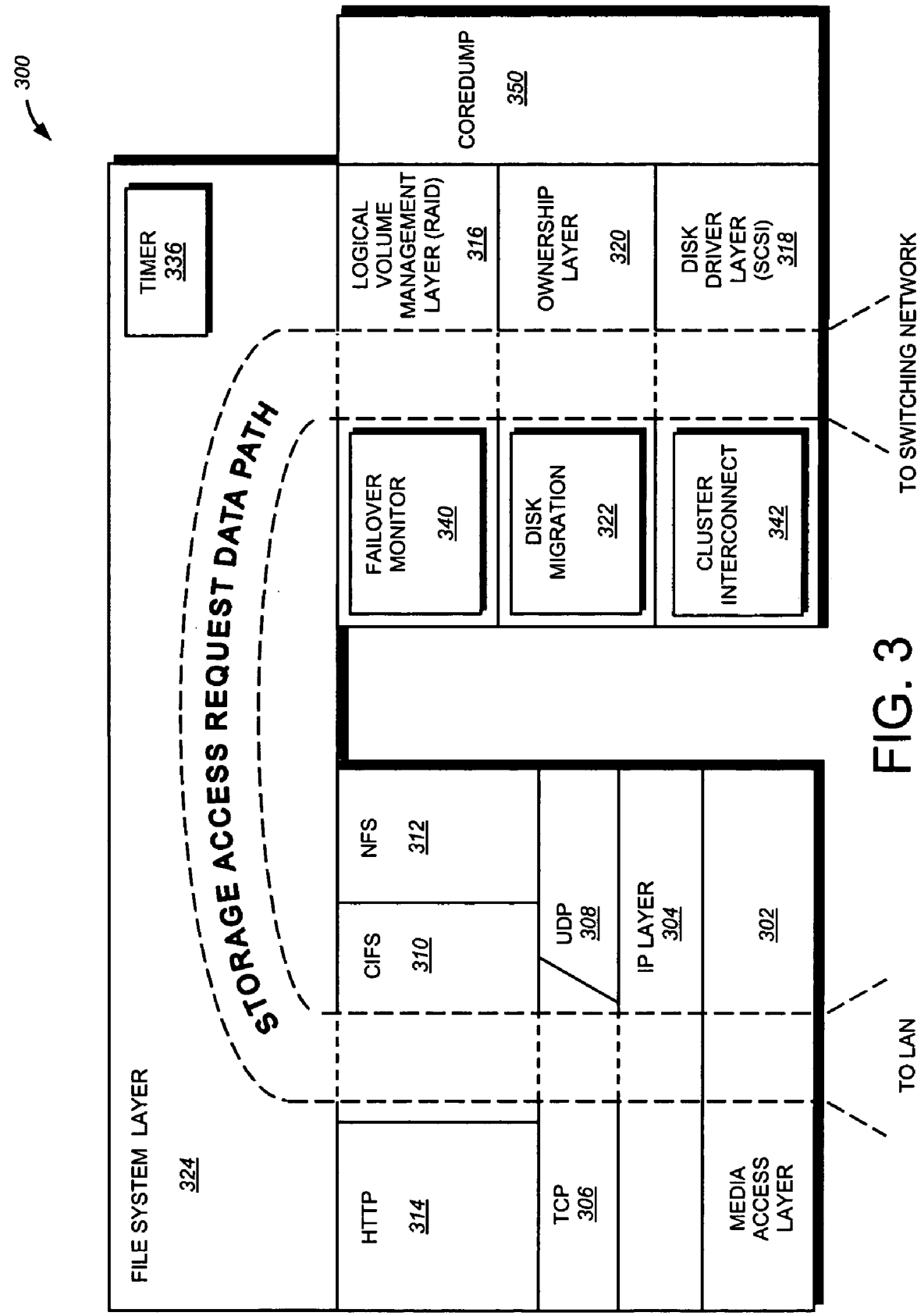
FIG. 3 is a schematic block diagram of a storage operating system for use with the exemplary file server of FIG. 2 according to an embodiment of the present invention.

FIG. 3 is a block diagram of an exemplary storage operating system 300 for use in accordance with an illustrative embodiment of this invention. Storage operating system 300 implements the specialized filer operations of the Data ONTAP™ storage operating system on each filer. The storage operating system comprises a series of software layers, including a media access layer 302 of network drivers (e.g., an Ethernet NIC driver) that function with network adapters 208 in FIG. 2. Storage operating system 300 further includes network protocol layers, such as the IP layer 304 and its supporting transport mechanisms, the Transport Control Protocol (TCP) layer 306, and the User Datagram Protocol (UDP) layer 308. A file system protocol layer includes support for the Common Interface File System (CIFS) protocol 310, the Network File System (NFS) protocol 312 and the Hypertext Transfer Protocol (HTTP) protocol 314.

In addition, the storage operating system includes a RAID (logical volume management) layer 316 that implements a disk storage protocol, such as the RAID protocol and a disk driver layer 318 that implements a disk access protocol, such as a Small Computer System Interface (SCSI) protocol. Included within the disk storage layer 316 is a disk ownership layer 320, which manages the ownership of the disks with respect to their related filers. A disk migration level 322 is a subset of the disk ownership level 320. In the event of a takeover, the filer's cluster partner logically assumes ownership of the storage. To accomplish this, the failover monitor layer (340 described below) places its reservation on the disks that are being taken over.

The storage operating system also includes the failover monitor layer or function 340 that governs failover detection and initiation of takeover by the cluster partner. The cluster interconnect function 342 is also shown as part of the storage stack. The coredump function 350 interacts with the RAID layer 316 and disk driver layer 318 to facilitate the transmission of the coredump in accordance with the teachings of this invention, as described further below.

Bridging the disk software layers with the network and file system protocol layers is a file system layer 324 that controls storage and retrieval of file system data. This includes a countdown timer 336 (the function of which is described in further detail below) that is used to time a period in which a failed filer must write its coredump. To make sure the takeover partner filer will eventually have complete control over all of the disks, even in the event that a coredump attempt freezes indefinitely, a time limit (approximately one to two minutes in one embodiment) for coredump completion is established. If the coredump does not complete within this time limit, the takeover partner will attempt to abort the coredump and then take control of the coredump disk.

Note that in an alternate embodiment the filer can be implemented as a multiprotocol storage appliance and the resident storage operating system can be implemented as a virtualization system with virtualization modules embodied as a virtual disk ("vdisk") module and a SCSI target module (not shown). The vdisk module is layered on the file system 324 to enable access by administrative interfaces, such as a streamlined user interface (UI), in response to a system administrator issuing commands to the multiprotocol storage appliance. In essence, the vdisk module manages SAN deployments by, among other things, implementing a comprehensive set of vdisk (lun) commands issued through the UI by a system administrator. These vdisk commands are converted to primitive file system operations ("primitives") that interact with the file system 324 and the SCSI target module to implement the vdisks. Generally, the file system layer 324 implements the file system having an on-disk file format representation that is a block based. The file system generated operations to load/retrieve the requested data of volumes if it not resident "in core," i.e., in the file server's memory. If the information is not in memory, the file system layer indexes into the inode file using the inode number to access an appropriate entry and retrieve a logical block number. The file system layer then passes the logical volume block number to the disk storage/RAID layer, which maps out logical number to a disk block number and sends the later to an appropriate driver of a disk driver layer. The disk driver accesses the disk block number from volumes and loads the requested data into memory for processing by the file server. Upon completion of the request, the file server and storage operating system return a reply, e.g., a conventional acknowledgement packet defined by the CIFS specification, to the client over the network. It should be noted that the software "path" through the storage operating system layers described above needed to perform data storage access for the client received the file server may ultimately be implemented in hardware, software or a combination of hardware and software (firmware, for example). This multiprotocol storage appliance arrangement is described in further detail in commonly owned U.S. patent application Ser. No. 10/216,453, entitled STORAGE VIRTUALIZATION BY LAYERING VIRTUAL DISK OBJECTS ON A FILE SYSTEM.

In a further alternate embodiment of the invention, some functions performed by the storage operating system may be implemented as logic circuitry embodied within a field programmable gate array (FPGA) or an application specific integrated circuit (ASIC). This type of hardware implementation increases the performance of the file service provided by a filer in response to a file system request issued by a client 110. Moreover, in another alternate embodiment of the invention, the processing elements of network and storage adapters may be configured to offload some or all of the packet processing and storage access operations, respectively, from the processor to thereby increase the performance of the file service provided by the filer.

Disk Regions

Figure 4:
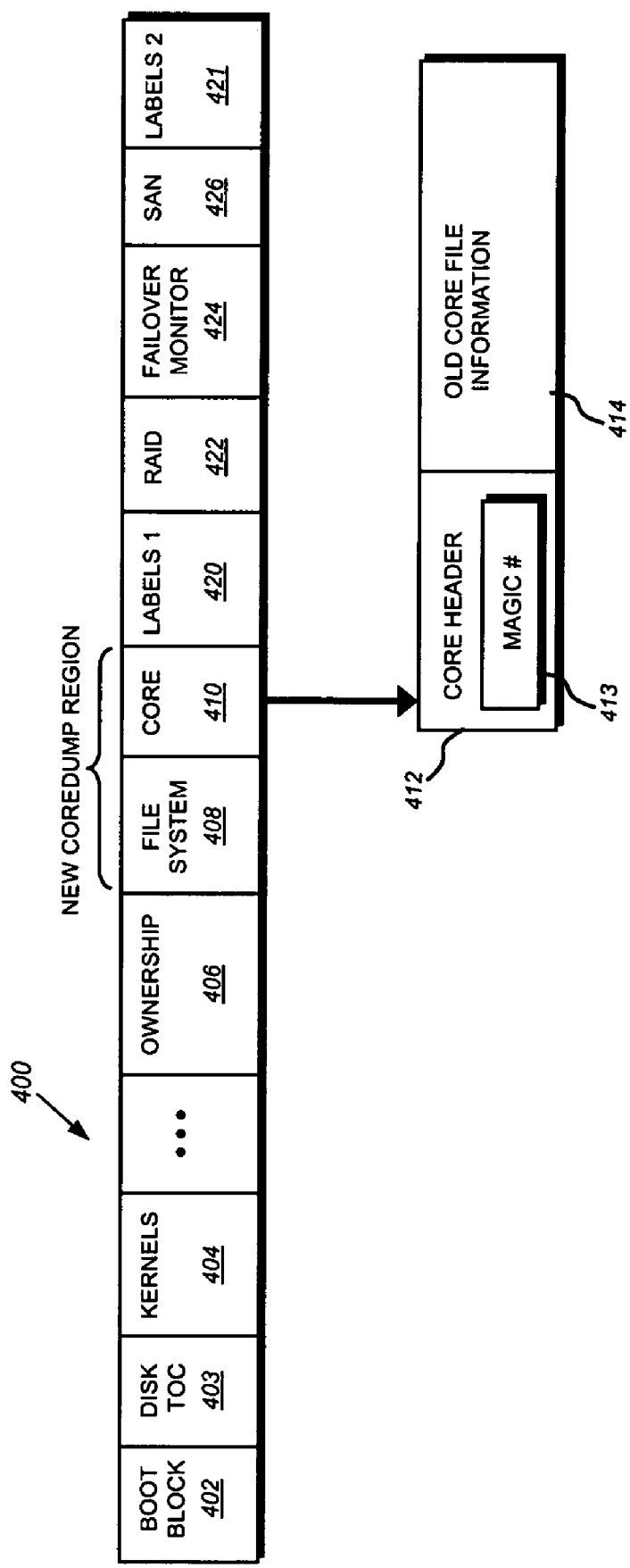
FIG. 4 is a diagram of the mapping of regions of a storage disk as used in an embodiment of the present invention.

Each disk contains a header information region at a standardized sector location that is known to the storage operating system. Various entries relative to the disk are provided at fixed offsets within this known region. As shown in FIG. 4, an exemplary disk (D1-Dn) is mapped out according to its storage regions. The RAID layer generally implements this mapping 400 as a disk table of contents (TOC).

The bootblock region 402 is contained for example in the first 1 KB block and is reserved for storing information about how to use the kernel region 404 on this disk, such as whether a valid kernel is present in the kernel region. The region 403 contains the disk TOC (Table of Contents). The TOC is located at a fixed offset from the beginning of the disk so it can be easily located. Within the TOC structure is provided the location of the coredump data, which includes information on the existence of a coredump within the disk. Further, within the disk label regions (420 and 421, described further below) information is stored that identifies the disk as a spare disk, or if the disk is in use for normal file service. If the latter is the case (normal file service), then additional information exists indicating the RAID group, plex, mirror and volume with which the disk is associated. The TOC region 403 may also include essential information about the disk required by the certain versions of the storage operating system, including a flag that indicates whether the disk is in use for normal file services and the physical size of the disk.

The kernel region 404 typically occupies the next area on the disk, and in one example, occupies approximately 20-MB of storage. This kernel region provides the area for storing appropriate portions of the storage operating system kernel. A failover sector is provided in accordance with this embodiment, and is described below.

The disk also contains disk ownership regions 406 that are mapped out over three blocks and provide information regarding disk ownership by volumes and file servers and (an illustrative embodiment) by respective storage area networks (SANs).

Following the ownership regions 406 is the file system region 408 that is used by the file system layer to store file system data (e.g. data related to files and directories). The file system region extends to almost the physical end of the disk's usable storage sectors.

Note that the bootblock region 401, the TOC region 403, the kernel region 404, the ownership region 406, and the file system region 408 are always at a fixed offset from the physical beginning of the disk so as to be readily and reliably locatable.

Following the file system region 408 is the core region 410. This region is formed from excess free space at the physical end of the disk. Its size is limited according to the present embodiment due to the presence of exemplary regions to be described below. The core region 410 contains a header 412 having a magic number 413. The magic number is stored in the first few bytes of the header where it is readily located and scanned by both the failed and takeover partner filer used. This magic number is, in essence, a coredump attribute designating whether or not a coredump is present, along with other status data. For example (see also below) the attribute might take the values of "no coredump," "coredump in progress," or "coredump complete." Hence, by scanning this attribute, a partner filer can determine whether it may initiate a takeover of a particular disk by checking its coredump attribute status and then placing reservations on inactive disks.

The remaining region 414 of the core region 410 is used to store a portion of the coredump according to the prior implementation. This region 414 is insufficient in size to store the entire coredump, however. A larger region is provided as described below, nevertheless, the header 412 and magic number information remains in place so as to be readily locatable by the operating system.

In the illustrative embodiment, additional regions are provided following the core region 410. As noted generally above, disk label 1 region (420) and label 2 region (421) are provided. In order to reduce the chance that both labels are destroyed by a disk corruption event, the label regions (420 and 421) are spaced apart. In this example, after label 1 region (420), a region 422 of 1 MB is reserved for use by the RAID system. In addition, following the RAID region 422 a failover monitor region 424 is provided for use in connection with the various functions of the failover monitors of both the filer and its cluster partner. In the case of a pair of clustered filers, 1 MB is provided in this region 424 for each filer (thereby totaling 2 MB). Also, an exemplary SAN region 426 is provided after the failover monitor region 424. This region is used generally in connection with SAN functions, and is not further described herein.

Note that the regions at the end of the disk that follow the core region 410 are also located at a fixed offset from the physical end of the disk. In general, while a particular layout for disk regions is shown and described, this is only one illustrative example and a variety of layouts with a variety of types of regions can be provided. Some regions may be at fixed offset, while others are variable and utilize (for example) pointers for data indexing. In addition, the nature and information content of the regions provided on the disk can be varied. In alternate embodiments, specialized/discrete regions can be provided for specific information types. Similarly, certain disk information can be included in other regions than those in which such information is contained in this example. In general, the disk should provide a mapping of regions that leads to (among other goals) a predictable identification of contents, the existence of coredump data and status of such data.

Coredump Disk

Notably, the illustrative embodiment contemplates that a spare disk (or another inexpensive dedicated disk, such as a conventional ATA/IDE disk) is used to store the entire contents of the coredump. By assigning the coredump to a single spare or dedicated disk, all other disks owned by the failed filer (active file service disks and other spare disks) can participate in the takeover process while the coredump proceeds in parallel (e.g. contemporaneously). The spare disk is mapped generally in accordance with FIG. 4 as described. However, the core region 410 is now used mainly to store the magic number 413 related to coredump status and header information 412 that points into the file system region 408. The file system region on the spare disk is now the designated coredump storage region. Accordingly, this area contains sufficient storage for a large coredump on a single disk. In this manner, the spare or other designated disk can be employed to receive the coredump whilst other disks participate in takeover, thus saving substantial time in completing the takeover. In fact, in accordance with the coredump procedure described below, the coredump can continue to proceed at its own pace on the failed filer after takeover of all other disks has been accomplished by the cluster partner.

Coredump Procedure

Figure 5:
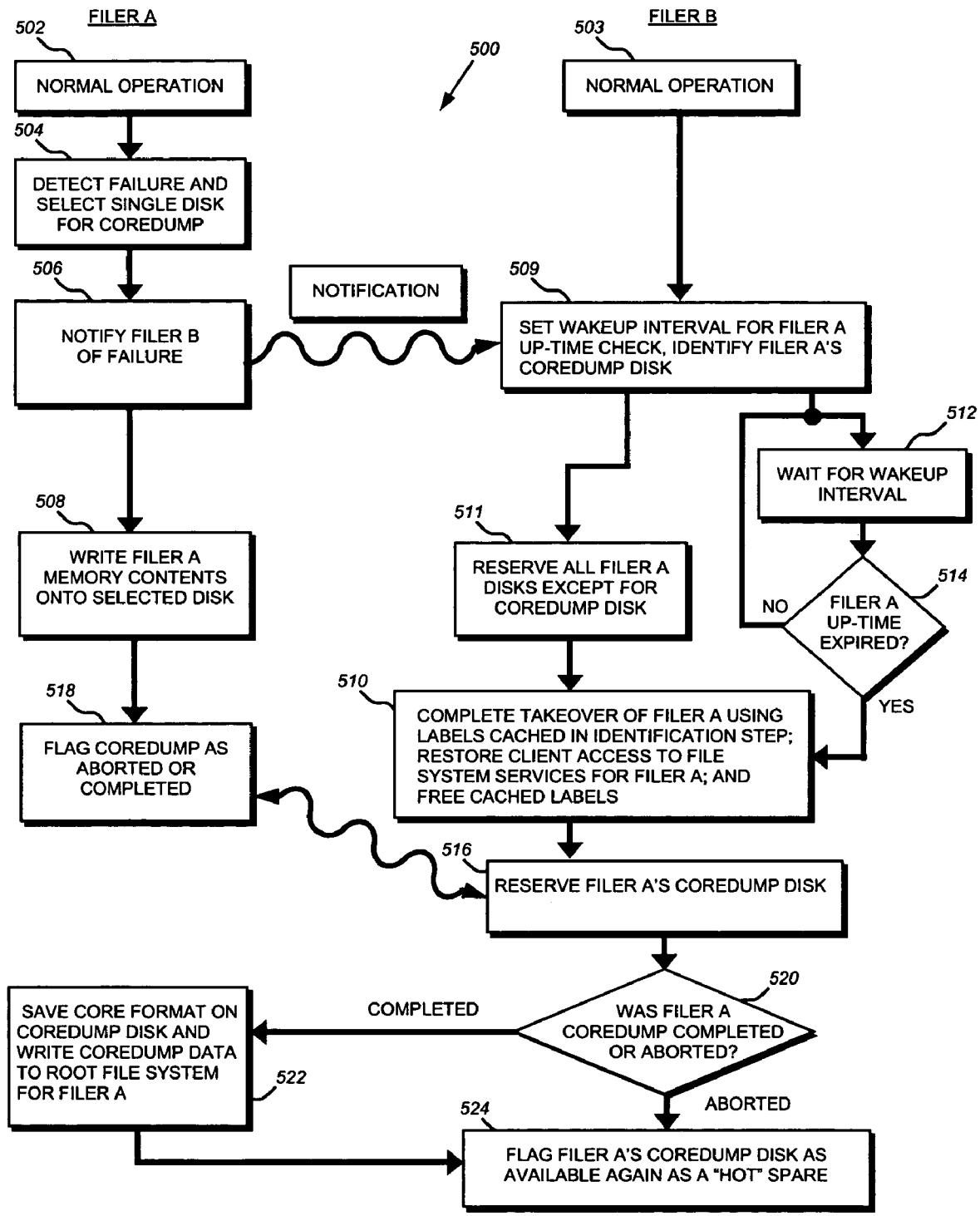
FIG. 5 is a flowchart illustrating the sequence of steps comprising a takeover of a failed filer by a cluster partner in parallel with a coredump.

FIG. 5 is an exemplary flow chart of a procedure 500, which two filers (A and B) in a clustered environment undergo in order to establish takeover in parallel with a coredump process. It should be understood by those skilled in the art that some steps may be taken out of order, and that other intermediate steps not herein described may be taken without departing from the spirit of the invention.

In steps 502 and 503, each of the two filers (A and B, respectively) operates normally (e.g. normal file service in a non-panic state) and monitors its own operational status to detect a problem in its operation. Once filer A (the "failed filer" in this example) detects a failure or panic, begins to fail (step 504) and confirms that the partner B can take over for it, it locates a single disk (either a dedicated, typically inexpensive disk or a spare disk) to write its entire memory to as a coredump. A technique for locating and selecting a spare disk to be used in the event of a coredump is described in detail in commonly owned U.S. patent application Ser. No. 10/764,773 entitled SYSTEM AND METHOD OF SELECTION AND COMMUNICATION OF A DISK FOR STORAGE OF A COREDUMP, the teachings of which are expressly incorporated herein by reference. The reader is particularly referred to FIG. 6 in this incorporated reference for a description of an exemplary selection procedure. For the purposes of this description, any acceptable disk can be selected that is not otherwise used in regular file services— that is, a disk that would be required to properly hand off complete file service from the failed filer to the partner filer. Such "file service" generally includes the handling and storage of data that is related to or requested by clients or that is otherwise needed for operation of the network (e.g. SAN) to which the cluster is connected. As such, a spare disk associated with the failed filer is a good choice for the coredump disk as it is not presently involved in file service or network operations.

At step 506, filer A notifies filer B via the cluster interconnect that it is proceeding with a coredump, and filer A changes a designated coredump attribute area (the magic number 413 in FIG. 4) on the selected coredump disk to indicate that the single spare (or otherwise designated) disk is receiving the coredump. At step 508, filer A writes its memory into the designated file system region of the selected coredump disk. Contemporaneous (in parallel) with the writing of the failed filer A's memory into the selected disk, at step 509, filer B ("partner filer") sets a wakeup interval for Filer A. This is a benchmark, after which time, the coredump disk will be reserved, regardless of coredump completion. Filer B (in step 509) identifies filer A's coredump disk and places a reservation (e.g., a SCSI reservation) on all filer A disks except for the coredump disk. Identification of the coredump disk can occur (in one exemplary embodiment) in accordance using the procedure shown in FIG. 7 in the above-incorporated SYSTEM AND METHOD OF SELECTION AND COMMUNICATION OF A DISK FOR STORAGE OF A COREDUMP. That is, filer B examines the labels of all disks owned by filer A to determine which are spares that may be in use by filer A for writing a coredump. Further, filer B examines the core magic number 413 in the core region of these spares to determine which are marked to indicate that they may be a coredump disk. Finally, after the core magic number on all filer A spare disks have been examined, filer B determines to which of those spare disks filer A is actively writing a coredump.

If filer B identifies from the above steps a spare disk to which filer A is writing a coredump, filer B refrains from placing any reservation on this disk. At this time the partner filer B is deemed to own all reserved disks (step 511). Hence, Filer B bypasses this coredump disk in its takeover, allowing it to remain accessed by failed Filer A for coredump. As takeover by Filer B of Filer A's disks is completed, Filer B restores file system service of data from Filer A's disks as soon as practicable (step 510).

As noted above, a wakeup timer is activated when Filer B is notified of the failure (step 509). The timer (336 in FIG. 3) is set so that, even if a coredump failure is encountered, the coredump disk is eventually reserved by Filer B, like all other non-coredump disks that have already undergone takeover. Filer B waits (step 512) for the time limit to expire (decision step 514) or the coredump to complete (step 518). At this time, the procedure in Filer B acts to reserve the coredump disk (step 516). If the coredump has not completed within the time limit, the procedure is aborted. Two steps are taken to abort the coredump. The first is via a communication between Filer A and Filer B. Filer B writes an abort flag in the core region of the coredump disk, telling Filer A to stop dumping core. Then, Filer B reserves the coredump disk. The reservation acts to stop all IO to the coredump disk from Filer A, this insuring the coredump has been terminated. A flag in the core region of the coredump disk is set (step 518) if Filer A completed the coredump, or aborted as a result of Filer B's request.

Filer B's "savecore" procedure checks (decision step 520) the flag to determine whether the coredump in the non-reserved coredump disk was completed or aborted.

According to step 522, the partner filer B then accesses the coredump disk to generate a coredump file or other appropriate data organization of the coredump contents. This process is directed by a "savecore" process that is part of the coredump utility (350 in FIG. 3) on the filer B's storage operating system 300. The coredump file may include various diagnostic aids, such as bookmarks, indices and the like, or may be only raw data from the failed filer's memory. According to an illustrative embodiment, while a coredump file is created, any access to the coredump disk for the purpose of a RAID reconstruction is prevented (since a spare disk is normally available for such reconstruction purposes). Once the coredump file is created, it is then written to filer A's file system root for later debugging (also step 522). The root file system for failed filer A generally resides on the taken-over (non-coredump) disks, which are now freely accessed by partner filer B as if it were filer A, itself.

Throughout this time, access by clients to Filer B has been maintained. In accordance with the takeover at step 510, clients have already gained access to the general data of Filer A, without the undue delay that a coredump would otherwise entail.

As noted above, the coredump disk contains a flag denoting the status of the coredump, which is eventually read by filer B. This attribute can either denote a coredump state in which a coredump is active, completed, and/or progressing—for example "coredump in progress" or "coredump complete." Conversely the attribute can denote a non-coredump state wherein a coredump is not present/non-active or has been aborted prior to completion—for example, "no coredump" or "aborted coredump." It is contemplated that use of a particular "aborted coredump" attribute, rather than simple "no core dump" may provide diagnostic information in certain embodiments. Also, in alternate embodiments, a partially written coredump may be preserved as a file in a manner similar to a complete coredump. Once, Filer B has written out the coredump file, this attribute is remarked "no-coredump" so that the spare can be made available as a "hot" spare (step 524).

It is expressly contemplated that the use of a single disk for performing a coredump-type procedure in the event of a system failure need not only be implemented at a cluster level. Rather, the principles described herein may be applied in a SAN or other networked storage environment where one disk is singled out for retention by the failed, owning system and used to dump system memory, while other owned disks are allowed to undergo immediate takeover by a non-failed element of the networked environment.

In certain instances, the coredump disk may be needed immediately for normal storage operations, and thus must be shifted to the available spare disk pool before completion of the coredump or coredump file creation. If a need by normal file services arises for the coredump disk, then the coredump disk can simply be reserved by takeover partner filer B, as this effectively aborts further coredump by failed filer A. It no longer owns the disk. Alternatively, a special "kill" signature can be written to the core magic number 413 in the region header 412 on the coredump disk. The coredump function in the failed filer A scans for this attribute, and when encountered, terminates the coredump.

The foregoing has been a detailed description of an illustrative embodiment of the invention. Various modifications and additions can be made without departing from the spirit and scope of the invention. For example, while files and directories are denoted herein, the data can be organized around a variety of data structures and the terms "file," "file system," "directory" and the like should be taken broadly to include a variety of "data structures," "data sets," or "data organizations." Likewise, while the RAID layer 316 utilizes a RAID organization, it is contemplated that a variety of storage arrangements can be employed. Similarly, while the storage devices described herein are disks, the principles of this invention can be applied to a variety of storage devices or media including, but not limited to, electro-optical, solid-state, magnetic, and the like. Further, while a single disk is used as a coredump disk, there may be alternate embodiments in which more than one coredump disk or "storage device" is used to store a coredump. The failed filer would maintain ownership of any such coredump disks in a manner generally described herein while allowing other disks to be taken over. Finally, it should be understood that any and all of the principles described herein can be implemented as hardware, software that consists of a computer readable medium executing program instructions on a computer, or a combination of hardware and software. Accordingly, this description is meant to be taken only by way of example, and not to otherwise limit the scope of this invention.

What is claimed is:

1. A method for taking over a failed filer owning disks that store file service data and owning at least one disk that is free of file service data by a clustered partner filer, the failed filer being adapted to perform a coredump in which, in an event of failure, memory contents of the failed filer are transferred to a disk, comprising:
    changing, by the failed filer, a coredump attribute on the disk that is free of file service data (the "coredump disk") from a non-coredump state to a coredump state and maintaining the coredump attribute on other disks owned by the failed filer in a non-coredump state;
    writing the memory contents to the coredump disk;
    identifying, by the clustered partner filer, the coredump attribute of the other disks and taking ownership of the other disks while allowing the failed filer to maintain ownership of the coredump disk;
    upon completion of the writing of the memory contents, changing the coredump attribute to a non-coredump state; and
    upon identification of the non-coredump state in the coredump attribute of the coredump disk, taking ownership, by the clustered partner filer, of the coredump disk.

2. The method as set forth in claim 1 where the coredump disk is a spare disk owned by the failed filer.

3. The method as set forth in claim 1 where the coredump disk is a disk dedicated to a coredump.

4. The method as set forth in claim 1 further comprising: creating, from the memory contents written on the coredump disk, a coredump data set for diagnosis of the failed filer and writing the coredump data set in a coredump file to a file system root of the failed filer.

5. The method as set forth in claim 1 where the step of writing the memory contents includes limiting writing to the coredump disk to a predetermined time limit following a failure event of the failed filer.

6. The method as set forth in claim 5 wherein the predetermined time limit is less than a maximum time of a panic of a network communicating with each of the failed filer and the clustered partner filer occurs.

7. The method as set forth in claim 5 wherein the step of limiting includes, upon elapsing of the predetermined time limit, changing the coredump attribute of the coredump disk to a non-coredump state.

8. The method as set forth in claim 1 wherein the coredump disk and each of the other disks owned by the failed filer include a plurality of predetermined regions including a coredump region and a file system data storage region and wherein the step of writing of the memory contents includes writing the memory contents into the file system data storage region of the coredump disk.

9. The method as set forth in claim 8 wherein the coredump region includes a coredump header adapted to store the coredump attribute.

10. A storage system including a first server owning interconnected first storage devices and a second server owning interconnected second storage devices, the first server and the second server being connected together by a cluster interconnect so that the second server can take over ownership of the first storage devices upon failure of the first server, the storage system comprising: a coredump function executed by the first server where the coredump function (a) causes the first server to write its memory to a coredump storage device chosen from one of the first storage devices in response to a sensed failure of the first server, each of the first storage devices including a coredump attribute (b) causes the coredump attribute of the coredump storage device to be set to a coredump state and the coredump attribute of other of the first storage devices to be set to a non-coredump state; and a takeover function executed by the second server where the coredump function (a) identifies each of the first storage devices with the coredump attribute set to the non-coredump state, (b) changes of each of the second devices having the coredump attribute set to the non-coredump state from ownership by the first server to ownership by the second server so that takeover of the ownership can proceed in parallel with the writing of the memory to the coredump storage device.

11. The storage system as set forth in claim 10 wherein the takeover function is adapted to cause the second server to logically assume ownership of the coredump storage device after the earlier of either an elapsing of a predetermined time limit or a completion of the writing of the memory to the coredump storage device.

12. The storage system as set forth in claim 11 wherein the coredump function is adapted to cause the coredump attribute of the coredump storage device to be changed to a non-coredump state after either the elapsing of the predetermined time limit or the completion of the writing of the memory to the coredump storage device.

13. The storage system as set forth in claim 12 wherein the non-coredump state comprises each of an aborted state, a completed state and a non-active state.

14. The storage system as set forth in claim 10 wherein the first storage devices each comprise a disk drive engaged in file service activity and the coredump storage device comprises a spare disk that is free of file service activity.

15. A computer-readable medium in a storage system that includes a first server owning interconnected first storage devices and a second server owning interconnected second storage devices, the first server and the second server being connected together by a cluster interconnect so that the second server can take over ownership of the first storage devices upon failure of the first server; the computer-readable medium including program instructions for performing the steps of:
  writing, by the first server, its memory to a coredump storage device chosen from one of the first storage devices in response to a sensed failure of the first server, each of the first storage devices including a coredump attribute;
  setting the attribute of the coredump storage device to be set to a coredump state and the coredump attribute of other of the first storage devices to be set to set to a non-coredump state;
  identifying each of the first storage devices with the coredump attribute set to the non-coredump state;
  changing of each of the second devices having the coredump attribute set to the non-coredump state from ownership by the first server to ownership by the second server so that takeover of the ownership can proceed in parallel with the writing of the memory to the coredump storage device.

16. The computer-readable medium as set forth in claim 15 further comprising the step of causing the second server to logically assume ownership of the coredump storage device after an earlier ending of either an elapsing of a predetermined time limit or a completion of the writing of the memory to the coredump storage device.

17. The computer-readable medium as set forth in claim 16 further comprising the step of causing the coredump attribute of the coredump storage device to be changed to a non-coredump state after either the elapsing of the predetermined time limit or the completion of the writing of the memory to the coredump storage device.

18. The computer-readable medium as set forth in claim 17 wherein the non-coredump state comprises each of an aborted state, a completed state and a non-active state.

19. The computer-readable medium as set forth in claim 18 wherein the first storage devices each comprise a disk drive engaged in file service activity and the coredump storage device comprises a spare disk that is free of file service activity.

20. The computer-readable medium as set forth in claim 15 wherein each of the first storage devices includes a coredump information region and a file system region and wherein the memory is written into the file system region of the coredump storage device.

21. The computer-readable medium as set forth in claim 15 further comprising creating, with the second server, a coredump data set from the memory written to the coredump storage device, the data set being adapted to enable diagnosis of a fault relative to the first server.

22. The computer-readable medium as set forth in claim 21 further comprising the step of writing the coredump data set by the second server to a file system root of the first server stored on the first storage devices.

23. A method for takeover in a storage system that includes a first server owning interconnected first storage devices and a second server owning interconnected second storage devices, the first server and the second server being connected together by a communication interconnect so that the second server can take over ownership of the first storage devices upon failure of the first server, comprising:
  writing, by the first server, its memory to a coredump storage device chosen from one of the first storage devices in response to a sensed failure of the first server, each of the first storage devices including a coredump attribute;
  setting the attribute of the coredump storage device to be set to a coredump state and the coredump attribute of other of the first storage devices to be set to set to a non-coredump state;
  identifying each of the first storage devices with the coredump attribute set to the non-coredump state; and
  changing each of the second storage devices having the coredump attribute set to the non-coredump state from ownership by the first server to ownership by the second server so that takeover of the ownership can proceed in parallel with the writing of the memory to the coredump storage device.

24. The method as set forth in claim 23 further comprising causing the second server to logically assume ownership of the coredump storage device after an earlier ending of either an elapsing of a predetermined time limit or a completion of the writing of the memory to the coredump storage device.

25. The method as set forth in claim 24 wherein the step of changing includes setting a reservation on each of second storage devices so as to establish ownership by the second server.

26. The method as set forth in claim 25 wherein the reservation comprises a SCSI-3 reservation.

27. A method for taking over a failed storage system owning disks that store file service data and owning at least one disk that is free of file service data by a clustered partner storage system, the failed storage system being adapted to, in a event of failure, transfer memory contents of the failed storage system to a disk, comprising: taking ownership of disks of the failed storage system that store file service data by the clustered partner storage system; and simultaneously writing the memory contents of the failed storage system to the at least one disk that is free from file service data; taking ownership of the at least one disk that is free from file service data by the clustered partner storage system upon completion of writing the memory contents of the failed storage system; setting by the failed storage system, a coredump attribute on the at least one disk that is free from file service data prior to writing the memory contents of the failed storage system to the coredump disk; re-setting by the failed storage system, the coredump attribute upon completion of writing the memory contents of the failed storage system.

28. The method of claim 27 further comprising:
  checking, by the clustered partner storage system, the coredump attribute to determine whether it is set or re-set; and
  taking ownership of the at least one disk that is free from file service data by the clustered partner storage system only after the coredump attribute is re-set.

* * * * *